July 12, 1966
D. K. REAMY
3,260,011
FISH LURE
Filed May 1, 1964
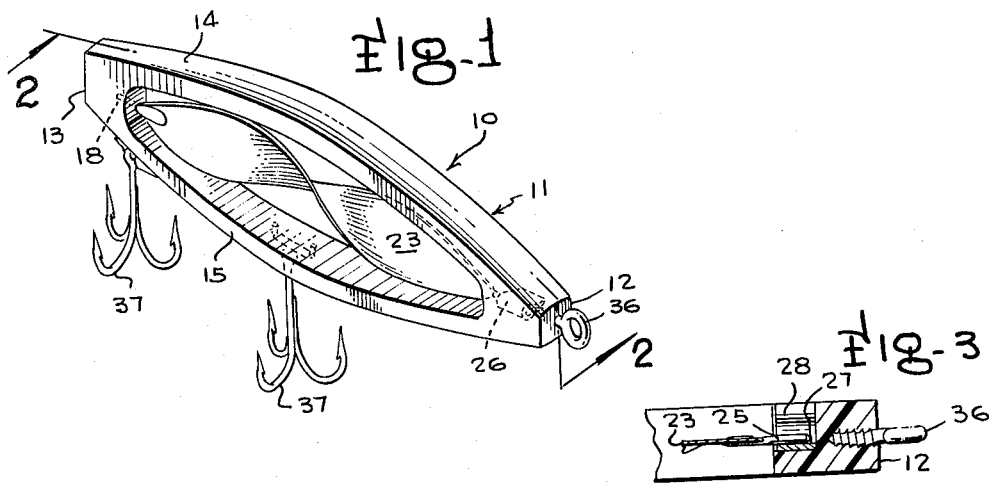
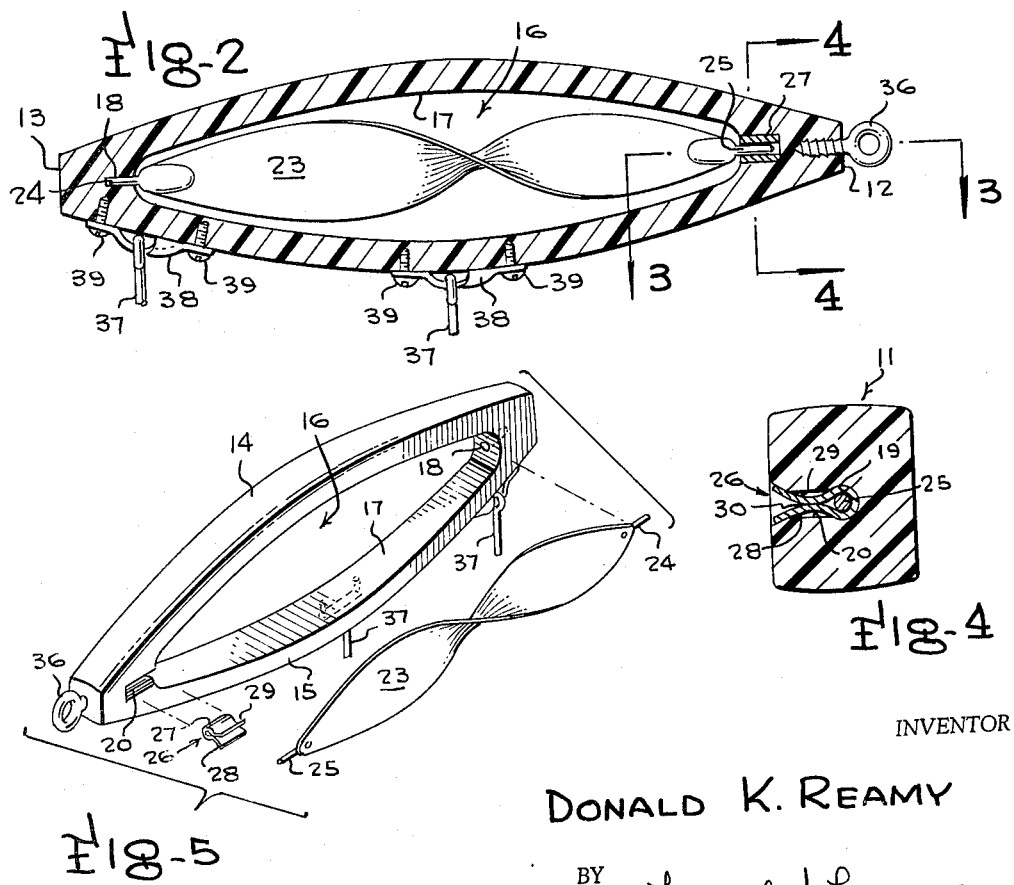
INVENTOR
DONALD K. REAMY
BY Mason, Fenwick & Lawrence
ATTORNEYS

3,260,011
FISH LURE
Donald K. Reamy, 19 Winnard Road, Hampton, Va.
Filed May 1, 1964, Ser. No. 364,214
1 Claim. (Cl. 43—42.09)

This invention relates in general to fish lures, and more particularly to a fish lure having the capability of being changed in character by the changing of a removable spinner to suit the requirements of the environment in which it is being used.

It is often desirable, when fishing, that the bait be changed if the fisherman is not achieving the desired results. This procedure often necessitates the changing of the entire lure which, of course, requires that the fisherman maintain and carry with him a large variety of lures. Frequently the basic lure need not be changed to effect a bait at which a desired fish will strike since only a relatively minor change of character may be enough to attract the fish.

Therefore, an object of this invention is the provision of a fish lure, the effective character and appearance of which may be readily and quickly changed to suit varying environmental conditions.

Another object of this invention is the provision of an improved fish lure having a frame body in which various colored fish attracting bodies may be inserted.

Another object of this invention is the provision of a fish lure having an elongated frame provided with means to detachably and removably support various spinners of different colors to produce special effects within the water.

A still further object of this invention is to provide an improved fish lure with detachable and interchangeable colored spinners which will be highly efficient in operation and relatively inexpensive to manufacture and produce.

Other objects, advantages and capabilities of the invention will become apparent from the following description, taken in conjunction with the accompanying drawings showing only a preferred embodiment of the invention.

In the drawings:

FIGURE 1 is a perspective view of the fish lure of the present invention showing the spinner in operable position;

FIGURE 2 is a side elevational view in longitudinal section of the fish lure;

FIGURE 3 is a fragmentary longitudinal section view in plan taken along lines 3—3 of FIGURE 2;

FIGURE 4 is a vertical section view taken along lines 4—4 of FIGURE 2 showing details of an operable spinner catch means; and FIGURE 5 is an exploded perspective view of the entire fish lure.

Referring to the drawings wherein like reference characters designate corresponding parts throughout the several figures, the novel fish lure is indicated by numeral 10. Comprising the fish lure 10 is a generally flat elliptical shaped body member 11 having truncated anterior and posterior ends 12, 13 respectively. A pair of frame members 14, 15 extending between the truncated ends in a generally convexo-convex manner form an interior elongated aperture 16, the peripheral extent of which forms curves which are complimentary to the peripheral curve of the convexo-convex frame members 14, 15. It is seen that the aperture peripheral interior curve 17 actually forms the peripheral extent of the aperture 16 and at the anterior and posterior ends the aperture 16 has a greater curvature than the major portion of the elongation of the elliptical body member 11.

Within the posterior truncated end 13, and lying in a plane that passes through the longitudinal center line of the body member 11, is a pre-drilled cylindrical bearing surface 18 which opens into aperture 16. Correspondingly located in the anterior truncated end 12 is an enlarged bearing housing 19 lying on the longitudinal center line of member 11 and opening both into the aperture 16 and exterior of the body member 11. The bearing housing 19 is of a circular configuration of somewhat greater diameter than the passageway 20 that leads from the housing 19 to the exterior of the body 11.

Located within the aperture 16 and supported solely within the anterior bearing housing 19 and the posterior bearing surface 18 is a removable spinner 23 of helical configuration and of a relatively thin member having a highly elongated shape of one-half twist over the entire length. Attached to the remote ends of spinner 23 are supporting shaft members 24, 25 which are received within the bearing surface 18 and bearing housing 19, respectively, in order that the spinner 23 may freely rotate therein whenever a suitable propulsive reaction force is provided to the spinner. Shaft members 24, 25 are attached to the spinner 23 by any suitable and well known methods such as soldering, brazing or the like, the only requirement being that they are securely fixed thereto. It will be noted that as the spinner 23 rotates within the aperture, the figure generated by the helix forms a complementary curve with the aperture peripheral interior curve 17.

Because of the nature of this invention, and since a major object is to provide a removable spinner, there is provided within the bearing housing 19 a suitable combination bearing and clip 26 of a generally pinched U shaped configuration. In the practical embodiment herein shown, the clip 26 comprises a bearing bushing surface portion 27 whose outside diameter corresponds to the internal diameter of the bearing housing 19 in order that a close fit may be obtained. Projecting from the bearing portion 27 and inwardly toward one another are flexible spring like legs 28, 29 which form a constricted and normally closed shaft entrance 30 after which point the legs 28, 29 diverge to fit closely to the side walls of the passageway 20. To functionally operate as the spinner securing means, the clip 26 is positioned within the bearing housing 19 and passageway 20 to form a retaining clip for the spinner 23 and a bearing surface for the spinner shaft 25. Shaft member 25 of the spinner is normally in rotative relation within the bearing surface 27 and because of the constricted and normally closed shaft entrance 30 the shaft 25 is securely held against accidental removal. However, it is a simple matter to insert the spinner 23 within the body 11 by inserting shaft 24 in bearing surface 18, positioning shaft 25 adjacent shaft entrance 30 and then applying a slight pressure upon the forward end of the spinner 23 in order to spread apart the legs 28, 29 and allow shaft 25 to be properly positioned. By providing such a clip as is herein proposed it can be seen that it is a simple matter to insert or to remove the spinner 23 as a fisherman may desire in order to change the character of his bait to suit the requirements of the environment in which he is fishing. This of course can be done simply by leaving the lure 10 attached to the line and reserve the insertion process for the spinner 23.

Of course it should be recognized that any clip means that would accomplish the desired purpose of holding the spinner in position and having the faculty of allowing the spinner to be removed from the body member 11 as may be desired, is within the scope of this invention.

Located in the truncated anterior end 12 on the longitudinal centerline is a threaded eye 36 for the purpose of allowing the fishing line to be attached thereto, and depending from frame member 15 are suitable hooks 37 secured to member 15 by hangers 38 which are affixed to member 15 by fasteners 39.

In the present invention it is anticipated that the body member 11 shall be constructed of a transparent or semi-transparent plastic material and that the spinner 23 be manufactured in a variety of colors. Because of the helical construction, upon the lure being pulled through the water, the spinner will be forced to rotate due to the pressure of the water moving against the helix and this rotation will reflect light off the spinner and through the body member. By changing the color of the spinner 23 a fisherman may change completely the character of his bait in order to attract a previously reluctanct fish. Another feature of this invention is that a fisherman needs to carry only one separate body member 11, however, he may have numerous spinners in his possession that, because of their shape, may be nested together for carrying purposes. Each spinner, of course, is completely safe in that it has no projecting fish hooks and such a construction provides a great convenience to the fisherman.

While I have particularly shown and described one particular embodiment of the invention, it is distinctly understood that the invention is not limited thereto but that modifications may be made within the scope of the invention and such variations as are covered by the scope of the appended claim.

What is claimed is:

A fish lure comprising, an elongated body having a central aperture and closed ends, a cylindrical bearing seat in one end of the body open to the central aperture, a bearing housing in the other end of the body open to the central aperture and to the exterior of the body, a resilient clip in the bearing housing, the clip having an open arcuate central section with separable legs extending therefrom defining an entrance throat into the central section, the bearing housing having an enlarged recess to receive the central section of the clip, means on the body for abutment by the legs of the clip to yieldingly hold portions of the clip legs in contact to close the throat into the central section of the clip, and a spinner having shaft means extending therefrom for seating in the cylindrical bearing seat and snapping into the central section of the clip to removably support the spinner for rotation within the aperture in the body.

References Cited by the Examiner
UNITED STATES PATENTS

| | | |
|---|---|---|
| 599,332 | 2/1898 | Halley. |
| 990,984 | 5/1911 | Immell _____ 43—42.12 |
| 2,378,370 | 6/1945 | Van Buren _____ 43—42.12 |
| 2,574,293 | 11/1951 | Sabin et al. _____ 43—42.12 XR |
| 2,629,960 | 3/1953 | Baxter _____ 43—42.12 XR |
| 3,042,461 | 7/1962 | Smith _____ 308—15 |

FOREIGN PATENTS

| | | |
|---|---|---|
| 525,509 | 1/1954 | Belgium. |
| 198,534 | 6/1923 | Great Britain. |

ANTONIO F. GUIDA, *Acting Primary Examiner.*

S. KOREN, *Examiner.*

R. L. HOLLISTER, *Assistant Examiner.*